(12) United States Patent
Long

(10) Patent No.: US 6,306,029 B1
(45) Date of Patent: Oct. 23, 2001

(54) SYSTEM FOR TREATING MEAT

(75) Inventor: John B. Long, Sarasota, FL (US)

(73) Assignee: Hydrodyne Incorporated, Hato Rey, PR (US)

( * ) Notice: Subject to any disclaimer, the term of this patent is extended or adjusted under 35 U.S.C. 154(b) by 0 days.

(21) Appl. No.: 09/605,528

(22) Filed: Jun. 29, 2000

Related U.S. Application Data

(60) Provisional application No. 60/140,975, filed on Jun. 29, 1999.

(51) Int. Cl.[7] .................................................. A22C 21/00
(52) U.S. Cl. ................................................................ 452/141
(58) Field of Search ............................................ 452/141

(56) References Cited

U.S. PATENT DOCUMENTS

| | | |
|---|---|---|
| 3,492,688 | 2/1970 | Godfrey . |
| 5,273,766 * | 12/1993 | Long .................................... 452/141 |
| 5,328,403 | 7/1994 | Long . |
| 5,841,056 | 11/1998 | Long et al. . |
| 6,120,818 * | 9/2000 | Long .................................... 452/141 |
| 6,146,262 * | 11/2000 | Long et al. ........................... 452/141 |
| 6,206,773 * | 3/2001 | Waits .................................... 452/141 |

FOREIGN PATENT DOCUMENTS

| | | |
|---|---|---|
| 99 52374 | 10/1999 | (WO) . |
| 00 01242 | 1/2000 | (WO) . |

OTHER PUBLICATIONS

Patent Abstracts of Japan, Publication No. 05336875, Publication Date Dec. 21, 1993, Inventor Suzuki, "Method for softening edible meat by detonation pressure and apparatus therefore".

* cited by examiner

*Primary Examiner*—Willis Little
(74) *Attorney, Agent, or Firm*—Browdy and Neimark

(57) ABSTRACT

A meat treating system, i.e. method and apparatus, for tenderization and/or killing microorganisms in and on the meat, includes an outer heavy-duty circular-cylindrical cylinder and a meat-holding inner container concentrically disposed within the outer cylinder with an annular space therebetween. The bottom of the cylinder is sealed so that a column of water can be supported in the annular space. Upon generation of an explosive discharge, a shock wave is created to effect tenderization and/or the killing of microorganisms. The explosive discharge, which can be created either by a chemical explosive or by a capacitor discharge, also serves to blow open the seal at the bottom of the cylinder permitting the column of water to escape.

9 Claims, 4 Drawing Sheets

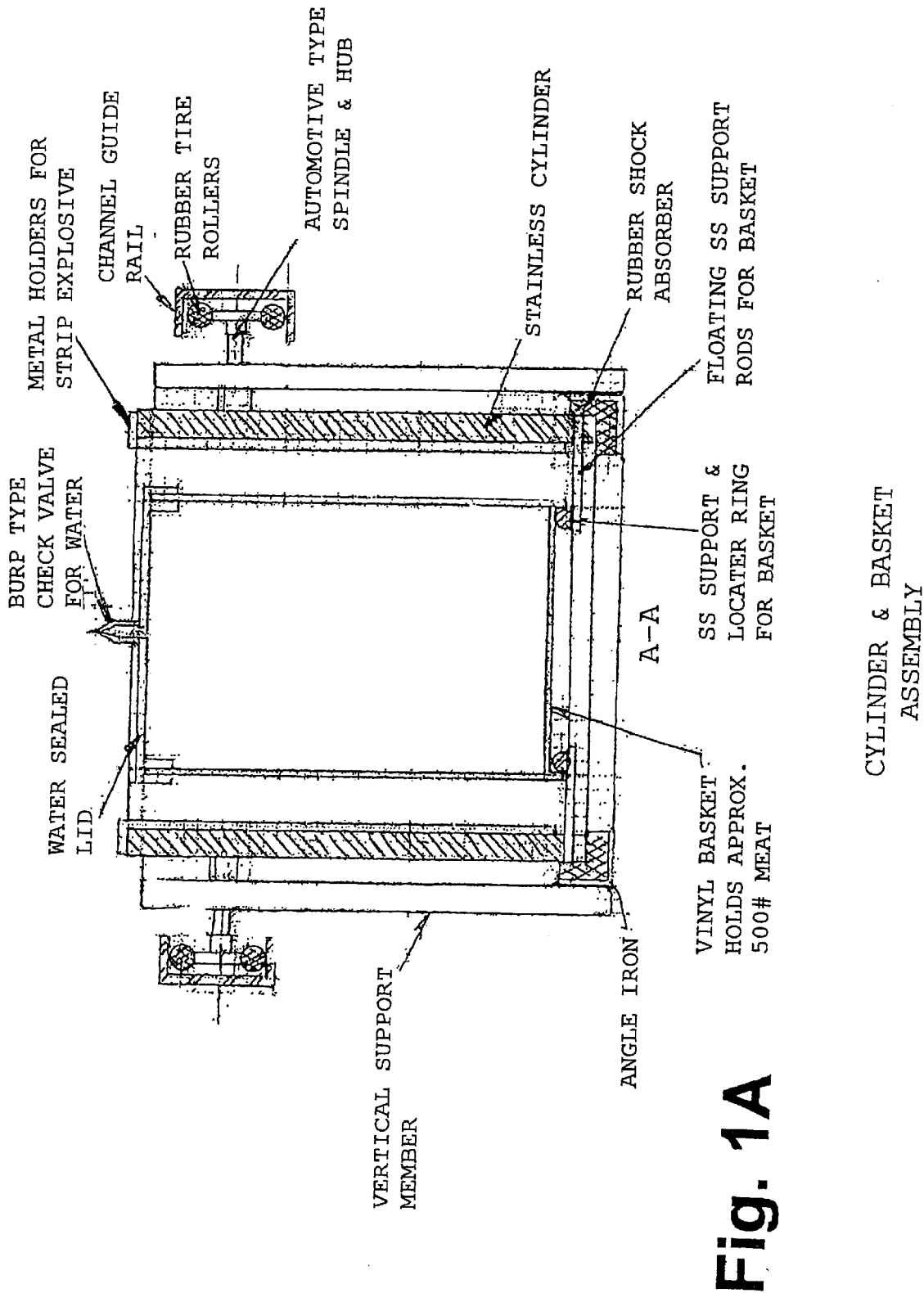
Fig. 1A  CYLINDER & BASKET ASSEMBLY

LINEAR ASSEMBLY

SYSTEM FOR TREATING MEAT

CROSS-REFERENCE TO RELATED APPLICATIONS

The present application claims priority under 35 U.S.C. §199(e) from U.S. provisional application No. 06/140,975, filed Jun. 29, 1999, the entire contents of which are hereby incorporated by reference.

FIELD OF THE INVENTION

The present invention relates to improvements in the treatment of meat for purposes of tenderization and/or killing microorganisms in the meat.

BACKGROUND OF INVENTION

Earlier U.S. patents in the name of John B. Long, U.S. Pat. Nos. 5,273,766; 5,328,403; and 5,841,056, relate to the treatment of meat by explosive discharge, known as the Hydrodyne System. Certain presently pending U.S. patent applications relate to various improvements on the embodiments disclosed in the aforementioned patents (see for example corresponding publications WO 98/38875 and WO 98/54975).

In one such improvement, as disclosed in U.S. application Ser. No. 09/346,738 (see WO 00/01242), the meat is supported within a basket or container, which is substantially accoustically transparent to shock waves, i.e. shock-wave transparent, and of cylindrical configuration spaced within and concentric with a high-strength shock-wave reflective cylinder, the annular space between the cylinders being filled with water or the like, and the inner basket also being filled with water in the spaces between the pieces of meat. The explosive discharge is initiated at or near the inner periphery of the heavy-duty shock-reflective cylinder at two positions spaced 180° from one another, or three positions spaced 120° from one another, or four positions spaced 90° from one another, etc., to provide balanced forces from opposite directions, and the explosive discharge may be produced by detonation of a chemical explosive, such as in strip form extending along the length or height of the heavy-duty shock-reflective cylinder, or from capacitive discharge.

SUMMARY OF THE INVENTION

According to the present invention, the apparatus can be further simplified and the system improved by two relatively simple expedients, these being (1) isolating the water surrounding the meat within the basket (hereinafter sometimes referred to as the "inner cylinder") from the water in the annular space between the basket (inner cylinder) and the heavy-duty outer cylinder, and (2) providing a seal such as in the form of a water sealing plastic sheet or the like, or a trap door type of structure, or a valve or the like, below the annular column of water between the inner cylinder and the outer cylinder, which seal or trap door or valve (hereinafter generically a "seal") opens, or is blown open or ruptured when struck by the gas bubble which follows the shock wave, thereby releasing the annular column of water to a catch basin therebelow. This avoids the necessity for a large exterior tank for holding water exterior of the outer cylinder, such as the hemispherical chamber shown in the embodiments of the aforementioned Long patents.

The quick release of water also creates an impedance mis-match and a rapid pressure drop which enhances the rupture of meat connective tissue and microorganism cell walls, producing a pop-corn like effect.

BRIEF DESCRIPTION OF DRAWING

An embodiment of the present invention is illustrated in the attached drawings wherein:

FIG. 1A is a vertical sectional view along line A—A of FIG. 1;

DETAILED DESCRIPTION OF EMBODIMENTS

Figure 1:
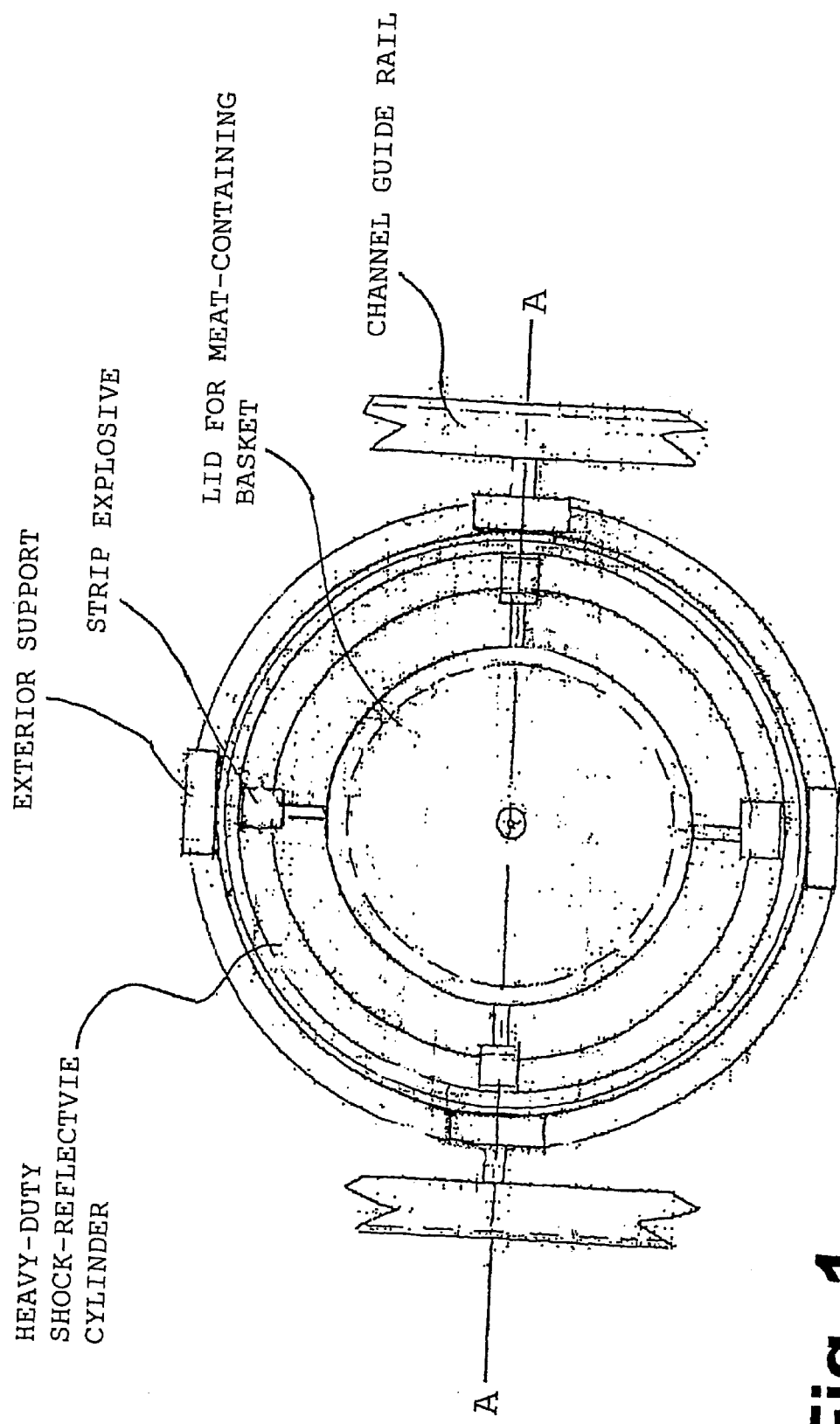
FIG. 1 is a top schematic plan view of a device according to the present invention for carrying out the method of the present invention.
Figure 2:
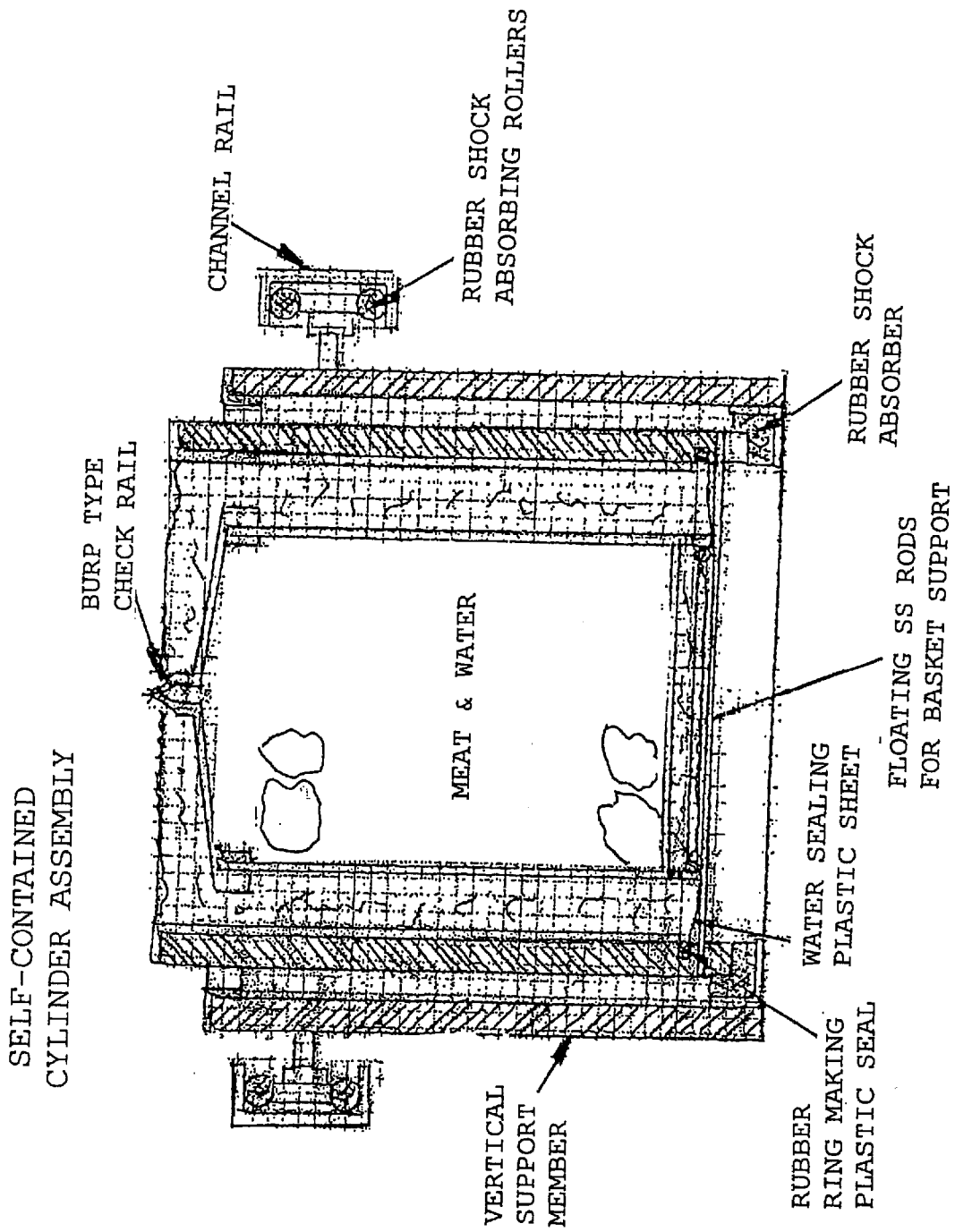
FIG. 2 is a vertical sectional view similar to that of FIG. 1 showing the present invention in use.

These figures show the heavy-duty shock-reflective cylinder, preferably made of stainless steel, supported in a frame of vertical support members for movement on a conveyer system including a channel guide rail and rollers which ride within said rail, such as rollers formed of rubber tires shown in cross-section in FIGS. 1A and 2. Unlike previously described embodiments of the Hydrodyne System, the apparatus of the present invention need not travel in a large water tank or dip into a large water tank at the location of explosive discharge, but instead is maintained entirely in the air.

The heavy-duty shock-reflective cylinder is desirably made of stainless steel or other strong material and Hahas a thickness of about 2 inches, roughly 5 cm. Such cylinder rests on a rubber mount or shock absorber to mitigate the relatively minimal shock in the downward direction upon explosion in the present system as compared with prior embodiments. Such a shock absorber, e.g. L-shaped in cross-section as shown in FIGS. 1A and 2, may in turn be supported by one or more angle irons or the like, also L-shaped in cross-section, these being connected to a support structure including vertical support members.

For holding the meat within the heavy-duty shock-reflecting cylinder, the basket or inner cylinder, formed of a material which is substantially transparent to the shock-wave generated by the explosion, i.e. which has an acoustic match with the liquid in the annular space and in the basket along with the meat, is suitably supported relative to the outer cylinder. As the liquid is preferably water, the basket is preferably formed of a suitable plastic material, such as polyethylene, polypropylene or plasticized vinyl polymer, e.g. Tygon. In essence, the basket is similar in size and shape to a typical plastic garbage can. However, the basket has a recessed bottom as best shown in FIG. 1A so that its sidewall extends downwardly below the bottom of the basket, the purpose for this construction being to facilitate centering of the basket within the heavy-duty cylinder. For this purpose, a ring is preferably provided at the bottom of the heavy-duty cylinder, concentrically supported by suitable structure which may be rods or a chain extending entirely across the diameter of the cylinder.

A key aspect of the present invention is the utilization of an operable seal, preferably a plastic sheet seal as shown in FIG. 2, to hold the annular column of water between the basket and the heavy-duty outer cylinder, as well as several inches of water (e.g. 3–6 inches) thereabove as shown in FIG. 2. The plastic sheet may be temporarily held in place in a variety of ways. As illustrated in FIG. 2, it may be maintained in part by the weight of the cylinder thereupon and in part by being retained in a groove in the inner wall of the heavy-duty outer cylinder by a rubber ring or the like.

Other mechanisms for temporarily holding the plastic sheet or film in place will be readily apparent.

Upon explosive discharge per the illustrated embodiment, half the shock-wave is directed inwardly toward the meat within the plastic basket; and the other half, initially directed outwardly, is immediately reflected from the interior wall of the heavy-duty cylinder, and these shock-waves pass through the liquid and through the wall of the plastic basket and into the meat causing tenderization and microorganism destruction. The shockwave is quickly followed by a gas bubble which forces the annular column of water both upwardly and downwardly and also tends to squeeze the plastic basket to some extent. The upwardly ejected water can be captured by a suitable water deflector as shown in Long et al 5,841,056. The water forced downwardly causes failure of the plastic film or sheet either by its rupture or by its being blown from its supporting structure, and this water is collected in a suitable trough or the like below the illustrated apparatus.

As illustrated, the plastic basket preferably has a lid which is locked in place by friction or other locking structure so as to isolate the water within the basket along with the meat from the water which surrounds the basket. This is desirable because, in the case of using a chemical explosive, the water in the annular column exterior to the meat-containing basket can become discolored and will moreover contain minute residues of the chemical explosive, and it is usually desirable to segregate this water from contact with the meat within the basket. As shown in FIG. 1A and FIG. 2, the basket lid desirably has a one-way check or burp valve so that, when the gas bubble squeezes the basket, water can escape therefrom without blowing off the lid. A balloon or other inflatable structure could be provided in place of the check valve.

An important advantage of the present invention lies in the elimination of complex and expensive equipment. By providing the water-sealing plastic sheet or film at the bottom of the heavy-duty cylinder, the need to submerge the entire assembly in water is eliminated, thus also eliminating the need for a large tank exterior to the heavy-duty cylinder. Use of the heavy-duty cylinder eliminates the requirements for resisting strong downward movement of the entire assembly, because the explosive forces are balanced.

Figure 3:
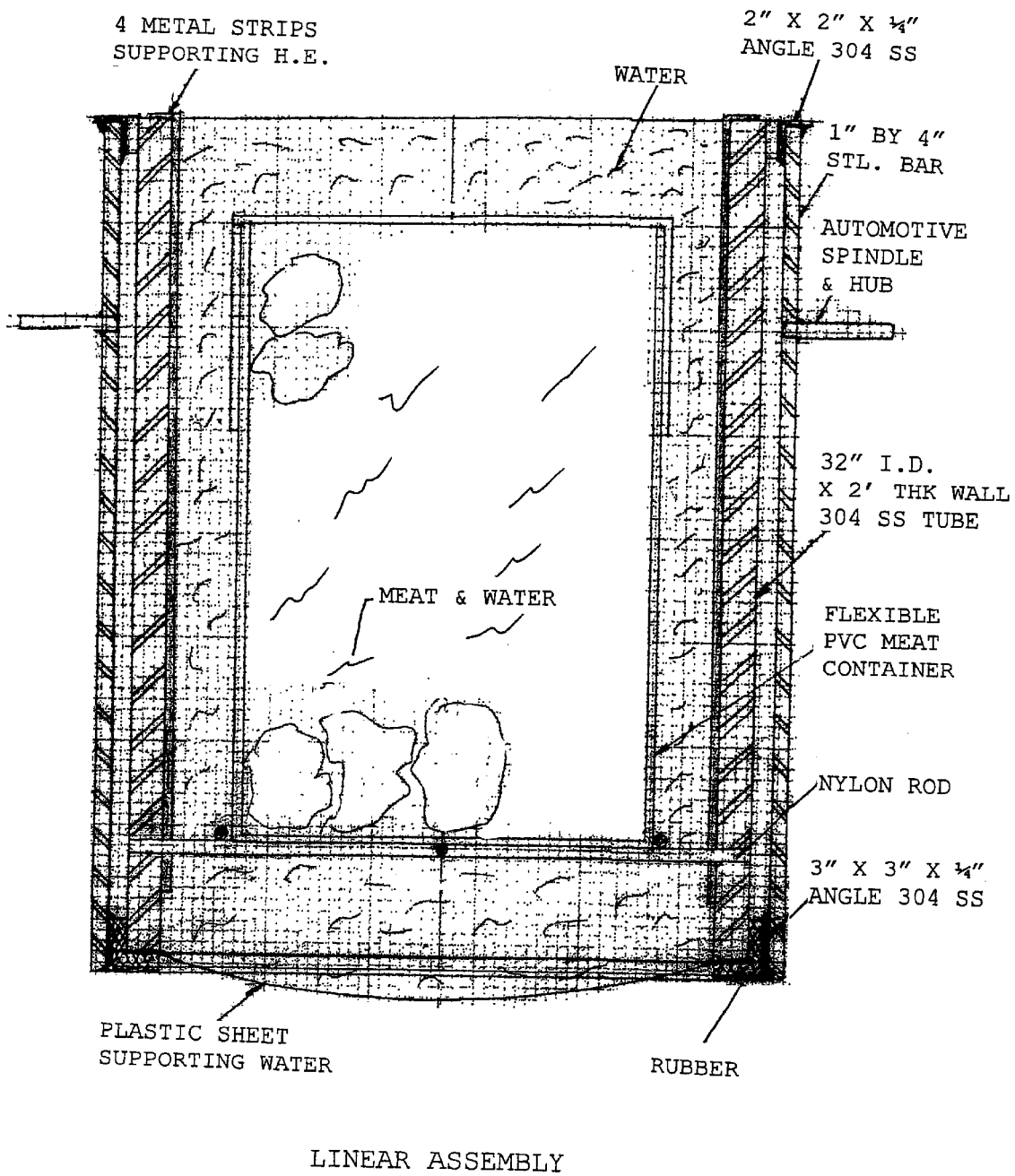
FIG. 3 is a vertical sectional view of a specific example of the present invention in use.

A specific example of the invention is shown in FIG. 3. At the center of the drawing is a container holding meat and water. The container is three feet high and two feet in diameter. When filled with meat and water, the contents weigh approximately 600 pounds. The meat fills about 75% of the volume, water filling the voids. As a result, on the average, the container will hold about 400 pounds of meat. The container is made of a plastic which has mechanical impedance which matches that of water, and the container sidewall is desirably ½ inch thick. The lid slides over the cylinder and has a skirt 12 inches long for frictionally engaging the upper part of the container wall, to prevent the lid from being blown off when the container is squeezed by the gas bubble. Not shown, in the center of the lid is a burping check valve so that air bubbles can be eliminated from the container, as shown in FIGS. 1A and 2.

Surrounding the meat container is a stainless steel tube or cylinder with a 32-inch inside diameter, 48 inches high, and with a 2-inch thick wall. When the meat container is placed within the stainless steel cylinder, a 4-inch annulus exists between the meat container and the wall of the stainless steel cylinder. The meat container rests on a support structure that consists, in this example, of one inch diameter straight nylon rods. The straight rods form a cross and fit in holes drilled in the heavy duty stainless steel cylinder about 6 inches from the bottom of the cylinder and at 90°. A circular nylon rod is attached to the straight nylon rods forming a cross and acts as a locating ring for the meat container.

An alternate to this example uses a metal chain, 4 pieces, coming through holes in the cylinder at or near the bottom thereof, and attaching to a metal ring made of a ½-inch diameter rod which is a few inches in diameter smaller than the diameter of the meat container. The reason for supporting the meat container with a structure that uses rods or chains coming through the holes in the heavy duty cylinder, is that items welded to a metal piece that is subjected to a shock from the explosion have a tendency to break loose after a few repetitions of the shock.

Hanging from the top edge of the cylinder are four metal strips about two inches wide and ⅜ inch to ½ inch thick. These strips are placed at 90° around the cylinder. On each of the strips is bonded a thin strip of explosive, desirably of the type disclosed in WO 98/38875. The explosive is made with partially cured bonding material such that the explosive strip can be applied to the metal strip in the same manner that pressure sensitive tape is applied. The explosive strip is about one millimeter thick and is three feet long. It is placed on the metal strip so that it is just opposite the meat-containing cylinder. The explosive strip may be detonated either at top or at the center or at both such locations. In all instances, the detonation of the strips is simultaneous.

Alternative constructions are shown in provisional application 60/166,159, filed Nov. 18, 1999, hereby incorporated by reference.

The support of the steel cylinder and meat holding inner cylinder may be accomplished by suspending them in a cage-like structure. Such a cage may be composed of two rings made of angle iron welded to four vertical pieces of steel 1 inch by 4 inches by 49 inches long placed at 90° on the angular rings. The bottom angle ring has a one-inch thick rubber ring as shown as a support for the steel cylinder. A plastic sheet is cut in a circular pattern and placed on top of the rubber ring. The steel cylinder is then placed in position on top of the rubber and plastic. The weight of the steel cylinder is such that a water-tight seal is made between the steel and the plastic. At this point, the volume of the steel cylinder which is not occupied by the meat filled container is filled with water. The plastic is strong enough to support the weight of the water. Now, the meat-containing cylinder is surrounded by water with 6 inches top and bottom and 4 inches between the meat cylinder and inside the steel cylinder.

When the explosive strips are detonated in the illustrated embodiment, shock waves radiate from the strips and meet in the center of the meat-containing cylinder. Pressure doubling occurs where the waves intersect. The waves are reflected back toward the steel cylinder, and when they reach the outside of the meat-containing cylinder, the water annulus has now been replaced by a gas bubble created by the explosive. In this and other embodiments, the plastic at the bottom is now also ruptured, producing a sudden loss of pressure. The gas bubble is no longer an impedance match with water, and so the shock-wave is reflected back into the meat-containing cylinder. This wave has much less pressure at its front, and so as it progresses it reduces the pressure in the meat and water, and as such can be called a tension wave. It has been shown that this type of shock wave enhances the tenderizing process.

EXPERIMENTAL EXAMPLE

All explosive testing was conducted in a 2.54 cm thick stainless steel cylinder (Cylinder Research Prototype I, Hydrodyne Inc., San Juan, P.R.) having an outer diameter of 20.32 cm and a height of 48 cm. Early deboned chicken breasts which are extremely tough as a result of deboning prior to rigor mortis, were suspended in the center of the cylinder between two strip explosive charges taped to metal inserts (2.5 cm by 48 cm) suspended at 180° from each other on the inner wall of the cylinder. The cylinder was placed in a hemishell for containment during detonation. The samples (n–2) were packaged in 0.5 cm thick, 3.8 cm inner diameter, 46 cm long vinyl tubing (#5233K-76, McMaster-Curr, New Brunswick, N.J.) and scaled using 3.8 cm diameter, 5.1 cm length plastic plugs (#003003 Plastisol, Rutland Plastic Tech, Pineville, N.C.). Two plastic cable ties were used on each end of the tube to secure the plugs.

The vinyl tubing was then sealed on both ends by heating the ends with a heat gun (model AH-751, Master Appliance Corp., Racine, Wis., 53401) and then clamping the hot ends together until cooled. The sealed ends of the tubing were filled with water by a hypodermic needle and the needle hole sealed with dust tape. The chicken breasts were packaged in water with special attention given to avoid air bubbles in the package. The cylinder was pieced 12 cm above the bottom of a water filled (approximately 13° C.) research hemishell (Model hemishell Unit 2,Hydrodyne Inc., San Juan, P.R.).

Sheet explosive (#DCEX35, PBX Sheet, Donovan Commercial Industries, Inc. Nortonville, Ky.) were used in all testing. A certified explosive expert performed the handling and detonation of all explosive. Two detonation devices were s used for each shot with one device on each piece of the sheet explosive. Tenderizing brought the chicken breasts well within the tender range recommended by taste testing panels. Results were excellent.

The present invention has several advantages over the previously-disclosed hemishell tank embodiment and the procedures that were a part of its use. These are:

1. When the explosive is detonated, all of the forces are balanced. The entire assembly remains in the same position. No separate support structure is required as is the case with the hemishell type system (eliminating about $30,000 worth of Belleville springs.).

2. The meat is contained in evacuated plastic bags. Up until now, there has been about a 5% loss in breaking bags. The assumption was that since the water contained explosive residues, the water might be contaminated, and therefore possibly the meat in a broken bag could be considered contaminated. The best performing bags were also quite expensive (several cents per pound for the meat contained). With the present system, the water in the meat-containing cylinder is potable water. If a bag breaks, the meat is not contaminated. It is now possible to use a single-layer layer high-strength bag for the shot, and then rebag in a multilayer thin bag with an oxygen barrier for shipping. The cost of the two bags is much less than the single bag used previously.

3. When detonated, the apparatus is located at ground level by a conveyor under a dome similar to that of U.S. Pat. No. 5,841,056 or the like, except that this dome is mounted in a fixed position such that the assembly can roll beneath it. Beneath the assembly is a cylindrical hole in the floor, lined with concrete, 4 or 5 feet in diameter, and about six feet deep. It has a drain for water and an exhaust system to remove gases from the explosion. A metal splash shield is placed between the dome and the floor. The water in the outer cylinder measures about 50 gallons. When the plastic at the bottom is ruptured by the explosion, about 25 gallons of water are propelled into the cylindrical hole, and the same amount propelled upwardly into the dome. This also ultimately is drained away by the cement hole. This compares with the nearly 500 gallons that is propelled upwardly and downwardly in the hemispherical system.

4. The conveyor construction and the preparation area for the present system are such that one shot per minute can be accomplished with a single dome. This compares with 6–7 minutes for the hemishell carousel system.

5. The cost for the present apparatus is about 10–20% of earlier embodiments. Also, the building required is about 200 that of the hemishell system.

While the invention is described above in conjunction with the employment of a temporary seal below the annular column of water in the form of a plastic sheet or film, it will be understood that other types of seals may also be used, e.g. trap doors of various types, valves which automatically open upon experience of a given pressure, e.g. spring-biased, or electronically-controlled valves which open immediately after the explosive discharge.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be .comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A method for treating meat to tenderize the meat and/or kill bacteria therewithin by explosive discharge comprises loading the meat within a basket formed of plastic or the like with water or another safe liquid, the liquid and the wall of the basket having approximately the same mechanical impedance; centering the basket within a heavy-duty shockwave reflective cylinder so that the basket and the cylinder are concentric, and with the annular space therebetween at least partially filled with water or the like, and wherein there is provided a seal at or near the bottom of the heavy-duty cylinder to support the annular column of water or the like thereabove; causing an explosion to occur within the wave reflective cylinder whereby a shock-wave passes through the meat, the shock-wave being quickly followed by a gas bubble which blows the water both upwardly and downwardly, the downwardly forced water opening the seal so that the downwardly forced water escapes the annular spaces.

2. The method of claim 1, wherein the seal is a temporary seal and the downwardly forced water blows out or fractures the temporary seal.

3. The method of claim 1 wherein the basket and the heavy-duty cylinder move or are conveyed entirely or substantially entirely through the air.

4. The method of claim 2 wherein the basket and the heavy-duty cylinder move or are conveyed entirely or substantially entirely through the air.

5. An apparatus for carrying out the method of claim 1 comprising an outer cylinder formed of a heavy duty material capable of repeatedly withstanding an explosive discharge and having a shockwave reflective inner surface; an inner container concentrically disposed within said outer cylinder and adapted for holding meat to be treated by explosive discharge, said container being formed of a material which is substantially transparent to a shock wave from an explosive discharge; a source of an explosive discharge for creating a shockwave passing through said meat and through said inner container for containment within said outer cylinder; a seal at a lower end of said outer cylinder, said seal being adapted to open upon the occurrence of an explosive discharge, and wherein said seal is sufficiently strong to support a column of water thereabove within said cylinder and surrounding said inner container.

6. The apparatus of claim 5, wherein said inner container has a lid which prevents mixing between water outside the inner container and contents within the inner container.

7. The apparatus of claim 6 wherein said lid has a one-way check valve which permits water to escape from said inner container but prevents water outside the inner container from entering the inner container.

8. In an apparatus for treating meat to tenderize the meat and/or kill microorganisms in the meat, comprising a treatment vessel for holding the meat and a source for an explosive discharge, whereby a shock wave from the explosive discharge passes through the meat, the improvement wherein said vessel includes an outer cylinder having a shock wave reflective inner wall, and an inner container for holding meat spaced within said outer cylinder; said inner container is substantially transparent to the shock wave; and the bottom of said outer cylinder is sealed by a seal capable of supporting a column of water thereabove, and said seal is capable of releasing water supported thereabove upon the occurrence of the explosive discharge.

9. The method of claim 1 such that a positive pressure shockwave passes through the annular column of water, through the meat container and to the center of the meat; as a result of implosion the wave reflects back through the meat upon encountering the annulus between the tank and the meat container, the water has been blown out and is replaced by a lower density medium (gas and water droplets); and wherein at this point the wave is reflected back into the meat, but is an unloading or tension wave which produces an enhanced tenderizing effect.

\* \* \* \* \*